(12) United States Patent
Livingston et al.

(10) Patent No.: US 7,090,098 B2
(45) Date of Patent: Aug. 15, 2006

(54) METERING AND DISPENSING CLOSURE

(75) Inventors: James W. Livingston, Santa Cruz, CA (US); M. Rinley Deeds, Felton, CA (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 10/709,449

(22) Filed: May 6, 2004

(65) Prior Publication Data

US 2005/0247742 A1    Nov. 10, 2005

(51) Int. Cl.
*B67D 5/58* (2006.01)
(52) U.S. Cl. .................. 222/651; 222/190; 222/370; 222/504
(58) Field of Classification Search ............... 222/651, 222/190, 370, 450, 452, 504
See application file for complete search history.

(56) References Cited

U.S. PATENT DOCUMENTS

| | | | | |
|---|---|---|---|---|
| 2,477,998 | A * | 8/1949 | McCowan | 239/310 |
| 2,584,781 | A | 2/1952 | Beatty | 222/362 |
| 2,865,537 | A | 12/1958 | Jackson | 222/214 |
| 2,944,707 | A * | 7/1960 | Steinmetz | 222/254 |
| 3,013,698 | A | 12/1961 | Gordon et al. | 222/158 |
| 3,263,866 | A | 8/1966 | Proctor | 222/181 |
| 4,032,050 | A | 6/1977 | Funk | 222/284 |
| 4,161,265 | A | 7/1979 | Hauser et al. | 222/181 |
| 4,243,158 | A | 1/1981 | Negosta | 222/184 |
| 4,832,235 | A * | 5/1989 | Palmer | 222/370 |
| 4,893,737 | A | 1/1990 | Borjesson | 222/360 |
| 4,964,185 | A * | 10/1990 | Lehn | 8/158 |
| 5,007,559 | A | 4/1991 | Young | 222/1 |
| 5,106,239 | A | 4/1992 | Krebsbach | 406/63 |
| 5,310,090 | A * | 5/1994 | Taylor, Jr. | 222/129 |
| 5,469,992 | A | 11/1995 | Jenkins | 222/362 |
| 5,495,962 | A | 3/1996 | Nomura | 222/80 |
| 5,829,085 | A | 11/1998 | Jerg et al. | 8/158 |
| 5,997,220 | A | 12/1999 | Wormser | 406/66 |
| 6,179,167 | B1 | 1/2001 | Boot et al. | 222/181.3 |
| 6,283,339 | B1 * | 9/2001 | Morrow | 222/452 |
| 6,550,640 | B1 * | 4/2003 | Smith | 222/1 |
| 2002/0008121 | A1 * | 1/2002 | Doelle | 222/370 |

FOREIGN PATENT DOCUMENTS

| | | |
|---|---|---|
| GB | 1068510 | 5/1967 |
| GB | 1 569 697 | 6/1980 |
| GB | 2 111 946 A | 7/1983 |
| GB | 2 208 569 A | 4/1989 |
| GB | 2 306 303 A | 5/1997 |
| WO | WO 03/023120 A1 | 3/2003 |

* cited by examiner

*Primary Examiner*—Joseph A. Kaufman
(74) *Attorney, Agent, or Firm*—Gregory S. Bollis; James J. Sales; Renee J. Rymarz (57) ABSTRACT

A metering and dispensing closure for a container wherein two rotatable disks rotate in conjunction with a stationary cap member to afford accurate measuring of a powder material and dispensing of it. The disks and the container cap afford a consistent measuring of the powder material, as well as provide a variety of drive members which can be utilized with the dispensing closure.

10 Claims, 8 Drawing Sheets

METERING AND DISPENSING CLOSURE

BACKGROUND OF INVENTION

The field of the invention is metering and dispensing devices for a powder material. More particularly, it relates to a powder dispensing closure which is connected to a container and can dispense accurate amounts of the powder into a liquid.

Dispensers of the type concerned with in this invention are disclosed in U.S. Pat. Nos. 4,032,050 and 5,469,992. The dispenser disclosed in U.S. Pat. No. 4,032,050 provides a rotatable metering disk 80 for materials to be dispensed. It is connected outside a container which poses sealing problems.

U.S. Pat. No. 5,469,992 also discloses a rotatable metering member 20. However, it is connected to a canister and not to a transportable container.

There are problems with rotatable measuring piece and stationary feed pieces. These cannot effect a desired internal stirring action of the container contents. Without this action, a significant amount of powder can be left in the container and not deposited into the measuring chamber.

The prior art does not provide a metering and dispensing closure which is connectable to a container and affords suitable sealing for powder materials which are hygroscopic.

Currently, the only reliable and cost effective method for dispensing powdered chemicals from small containers (between 1 and 4 kg), is to use a water spray and screen approach. There are two important limitations with these systems; the feed-rate is very inconsistent, and the powder formulations are limited. Such a method is described in U.S. Pat. No. 5,007,559.

The feed-rate varies over at least a 3:1 range and sometimes more due to the amount of powder remaining in the container, any bridging that may occur due to solidification near the screen, water pressure, spray pattern variation, water temperature and batch to batch variations. To control the amount of product dispensed, these systems typically require a concentration feedback control subsystem to compensate for their variable feed-rates. By far the most common is the conductivity feedback control used in dishwashing applications. Stated another way, because of the feed-rate variation, "spray/screen" powder dispensing systems normally can not be used in applications where a repeatable dose is required. This invention avoids this limitation by providing a precise and consistent metered dose based on a volumetric measurement.

The "spray/screen" dispensers work only with a limited range of powders and formulations. Detergents, the most commonly fed powders, are limited to formulations that will not create excess exothermic heat if the spray should penetrate into the powder. This has typically meant that the caustic (typically NAOH or KOH) level needs to be kept below about 40% to prevent the possibility of steam generation within the container which can be a safety issue. The metering and dispensing closure of this invention would remove this limitation and allow more powerful detergent powders to be formulated with perhaps up to 70% caustic concentrations for soft-water dishwasher applications. This would represent a 40% to 50% increase in "power" in a single container.

Many powders simply cannot be fed at all using the "spray/screen" method. These include any powders that tend to absorb water quickly and turn into a gel before they can be dissolved at the screen. The metering and dispensing closure of this invention obviates this.

SUMMARY OF INVENTION

The shortcomings of the prior art are overcome by the metering and dispensing closure for a container of this invention which includes a container cap member attachable to the container. The container cap member has a first side adapted to be mounted facing an inside of the container and a second side adapted to be mounted facing an outside of the container. A measuring chamber is positioned in the container cap member.

There is a first rotatable disk member having at least one passage which is mounted on the first side of the container cap member. There is also a second rotatable disk member having a passage therein which is mounted on the second side of the container cap member.

When the disk members are rotated, powder material passes sequentially through the one passage in the first disk member, into the measuring chamber of the cap member and then through the passage of the second disk.

In one aspect, the first and second rotatable disk members are connected to each other.

In another aspect, the second rotatable disk member includes a drive shaft engagement portion.

In yet another aspect, the second rotatable disk member includes a gear for engagement by a complementary gear of a drive gear.

In a preferred embodiment, the cap member includes threads for attachment to complementary threads of the container.

In another preferred embodiment, there is provided a powder dispensing apparatus which includes a container cap member attachable to the container, the container cap member having a first side adapted to be mounted facing an inside of the container and a second side adapted to be mounted facing an outside of the container. A measuring chamber positioned in the container cap member.

There is a first rotatable disk member having at least one passage therein, the first rotatable disk member mounted on the first side of the container cap member. A second rotatable disk member has a passage therein with the second rotatable disk member mounted on the second side of the container cap member, the first and second rotatable disk members connected to each other with the second rotatable disk member including a drive shaft engagement portion. There is also a drive shaft connected to the drive shaft engagement portion and a drive member connected to the drive shaft.

When the disk members are rotated, powder material passes sequentially through the one passage in the first disk member, into the measuring chamber of the cap member, and then through the passage of the second disk.

A general object of the invention is to provide an improved dispensing device for a powder material.

Another object is a powder dispensing device which can provide a seal for the powder being dispensed.

Still another object is a dispensing device of the foregoing type which is easily connected to a container.

Yet another object is a dispensing device of the foregoing type which can be driven by a variety of drive means.

Still yet another object is a dispensing device of the foregoing type which can accurately measure a powder material being dispensed.

Further objects and advantages of the invention will become apparent from the description of the preferred embodiments which follows.

BRIEF DESCRIPTION OF DRAWINGS

FIG. 2 is an assembly view of the component parts of the dispensing apparatus;

DETAILED DESCRIPTION

Referring to FIGS. 1–5, the metering and dispensing closure generally 10 is shown in conjunction with a container 12 supported in a receptacle 14 for housing the closure 10. A water intake conduit 16 controlled by solenoid valve 18 is utilized to introduce water into the receptacle 14. A water solution outlet conduit 20 is also in communication with the receptacle 14. A drive member 22 drives a drive shaft 24, the drive shaft being journalled in the collar 26 with a seal 28.

Referring to FIG. 2, it is seen that the metering and dispensing closure generally 10 is composed of three basic components. There is a cap member 30 with an upstanding wall 31 and internal threads 32 for engaging complementary threads on the container 12. There is also a rotatable disk 36 with a raised peripheral wall 37 as well as a cutaway portion 38. Rotatable disk 36 is seated inside the cap member 30. The third component is a rotatable disk 43 with a raised peripheral wall 46 and a stub shaft 48 with projections 49. These fit through an opening 34 in the cap member 30 in a manner that the projections 49 engage slots 41 in the rotatable disk 36. Rotatable disks 36 and 43 are rotated by the shaft 24 connected to the stub shaft 48.

The metering and dispensing closures or embodiments 10A, 10B, 10C and 10D shown in FIGS. 6, 7, 9, and 11, respectively, employ some of the same basic components as previously described for embodiment 10, except they have an A, B, C or D suffix.

Figure 6:
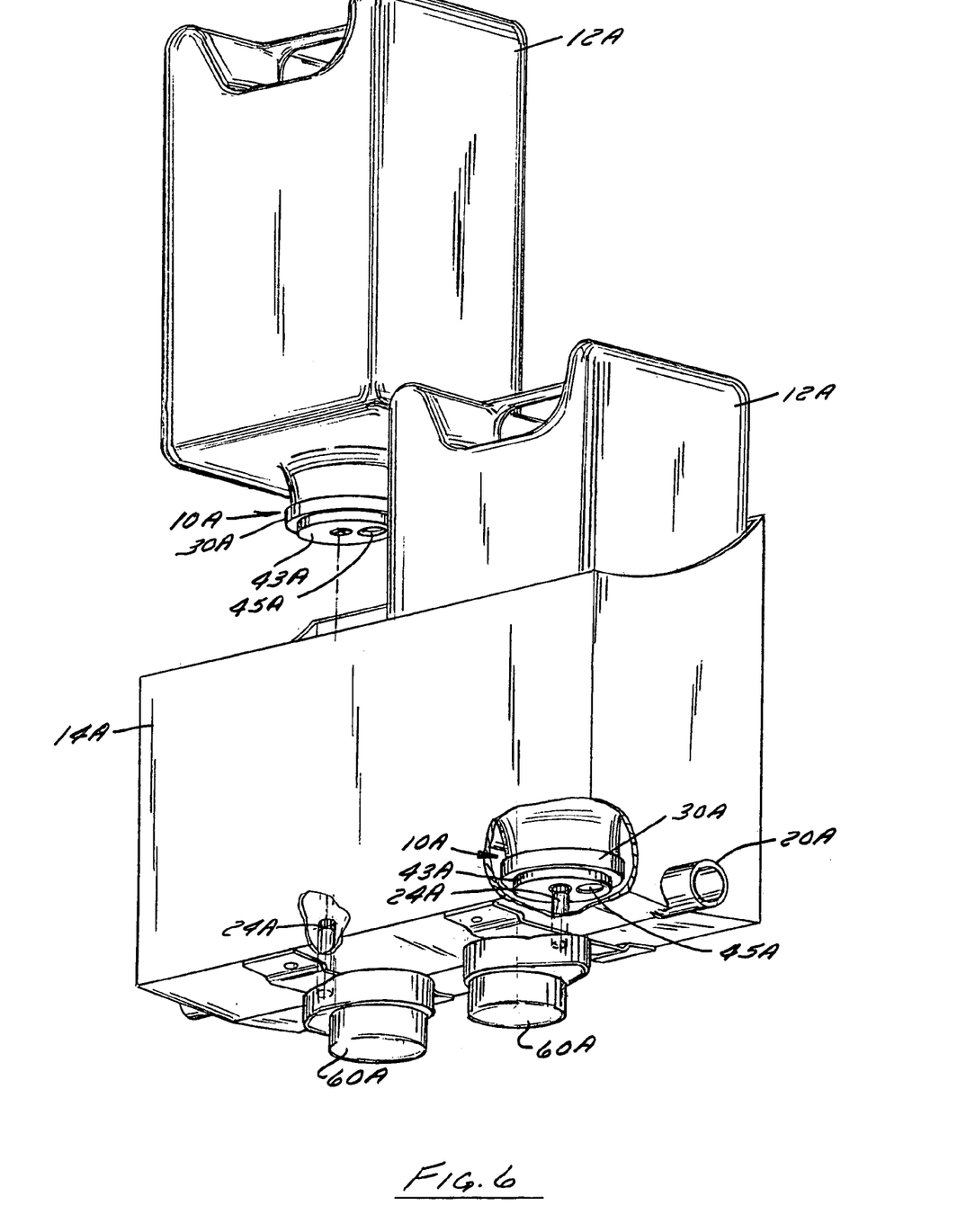
FIG. 6 is a perspective view of another embodiment of the dispensing apparatus in conjunction with a receptacle.

Embodiment 10A illustrates two dispensing closures for the container 12A as well as two drive motors 60A for the drive shafts 24A. The drive shafts 24A rotate the rotatable disk 43A as well as an internal rotatable disk 36A not shown.

Figure 7:
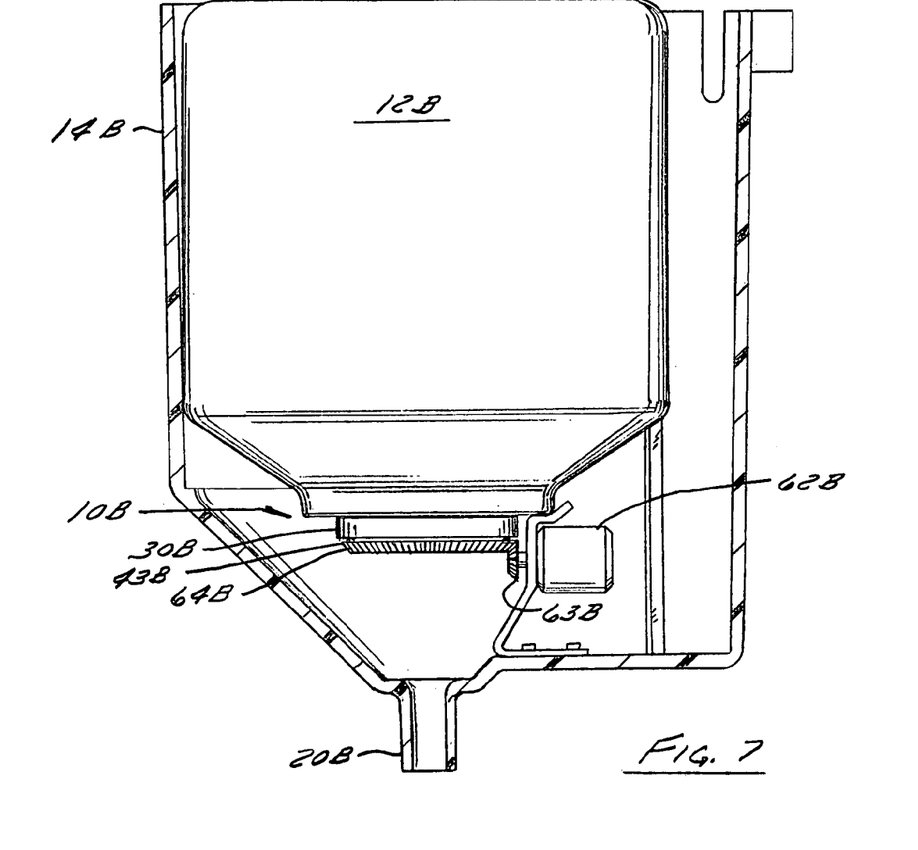
FIG. 7 is a view similar to FIG. 1 showing another embodiment.
Figure 8:
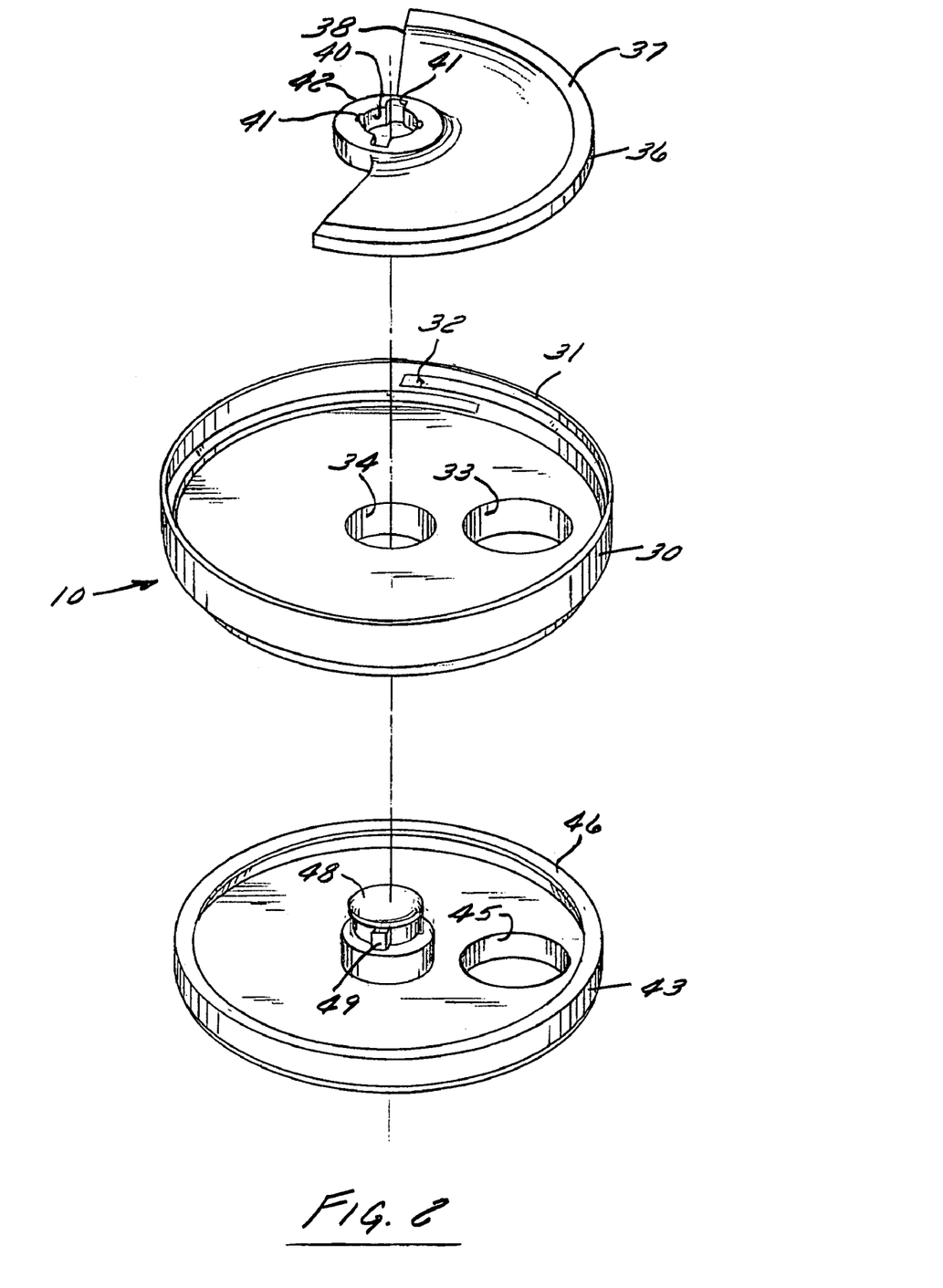
FIG. 8 is a partial view in section illustrating a drive mechanism for the FIG. 7 embodiment.

Embodiment 10B shown in FIGS. 7 and 8 differs from that shown for 10 in that it has a different drive mechanism for rotating rotatable disks 43B and 36B. This is accomplished by the motor 62B and the drive gear 63B which engages the ring gear 64B on the rotatable disk 43B. Rotation of disk 36B is effected by the stub shaft 48B connected to rotatable disks 43B and 36B. Another difference is the location of the water outlet conduit 20B directly beneath the metering and dispensing closure 10B. The interaction of the previously described components is seen in FIG. 8.

Figure 9:
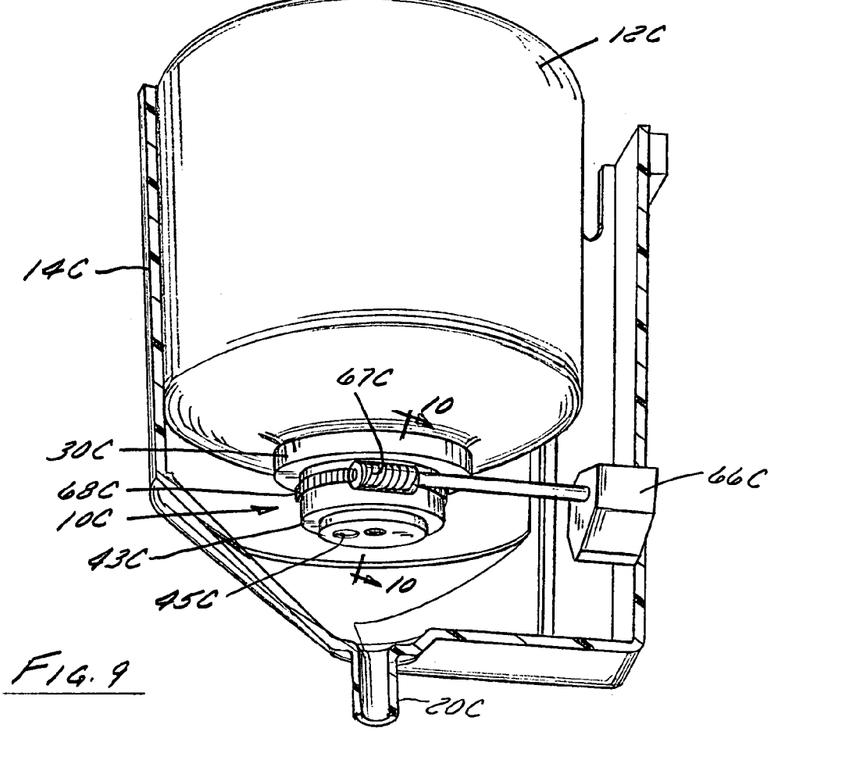
FIG. 9 is a view similar to FIG. 7 showing yet another embodiment.
Figure 10:
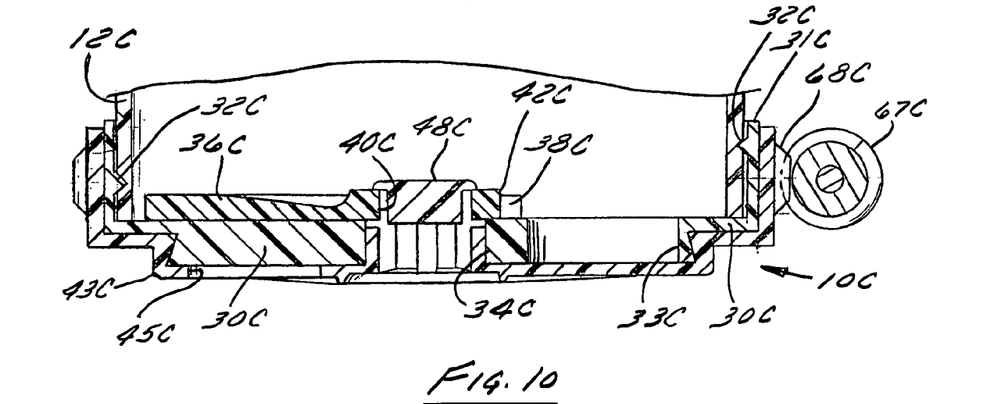
FIG. 10 is a view taken along line 10—10 of FIG. 9 showing the drive mechanism.

The FIG. 9 10C embodiment is similar to that of the 10B embodiment shown in FIG. 7, but includes a motor 66C connected to worm drive gear 67C for driving the ring gear 68C on the rotatable disk 43C. Stub shaft 48B is interconnected with disks 43C and 36C to provide rotation thereof. The positioning of the rotatable disks 36C and 43C with respect to the cap member 30C is illustrated in FIG. 10.

Figure 11:
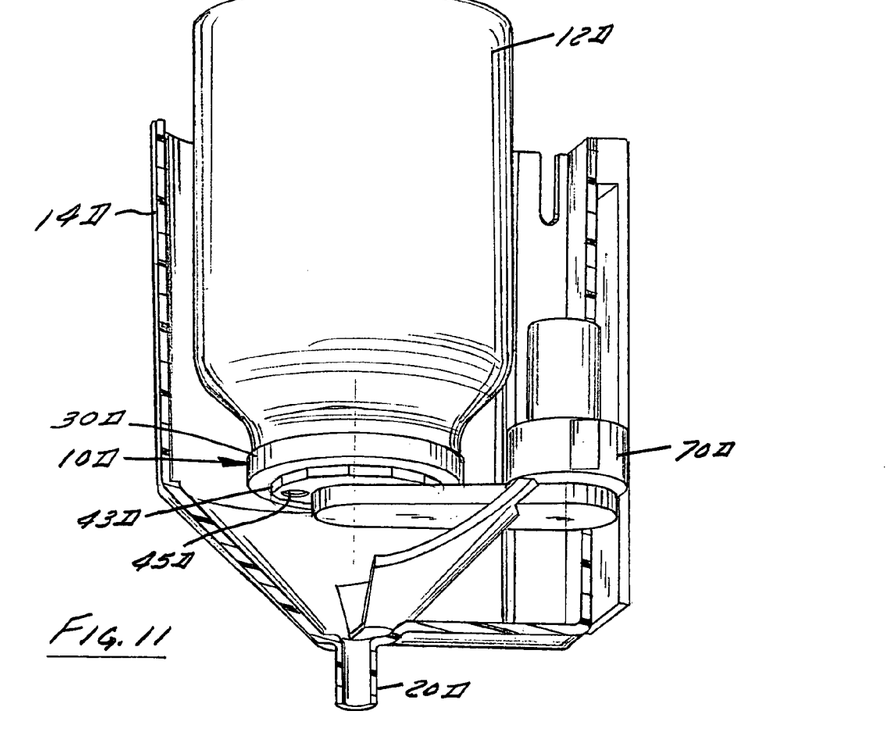
FIG. 11 is a view similar to FIG. 1 showing still another embodiment.
Figure 12:
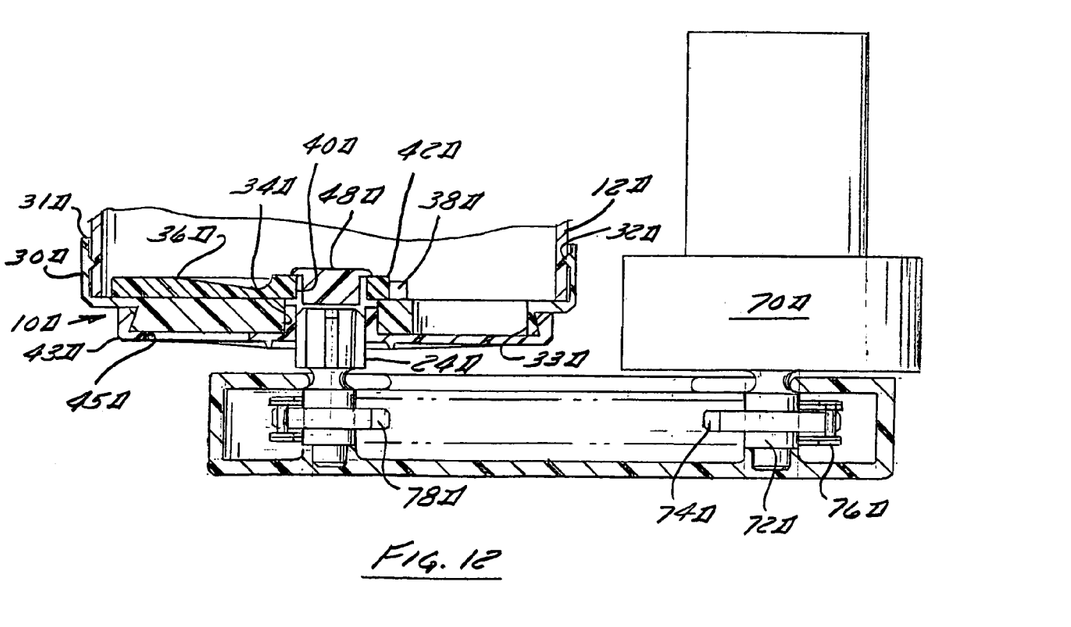
FIG. 12 is a view illustrating the drive mechanism for the FIG. 11 embodiment.

The embodiment 10D shown in FIG. 11 differs from the embodiments shown in FIGS. 6, 7 and 9 in that yet another means for rotating the disks 43D and 36D is illustrated. In this embodiment, a motor 70D drives the drive shaft 72D having the sprocket 74D for engaging a chain 76D which in turn drives the sprocket 78D on the drive shaft 24D. Drive shaft 24D effects rotation of stub shaft 48D and accordingly disks 43D and 36D.

Operation

Figure 1:
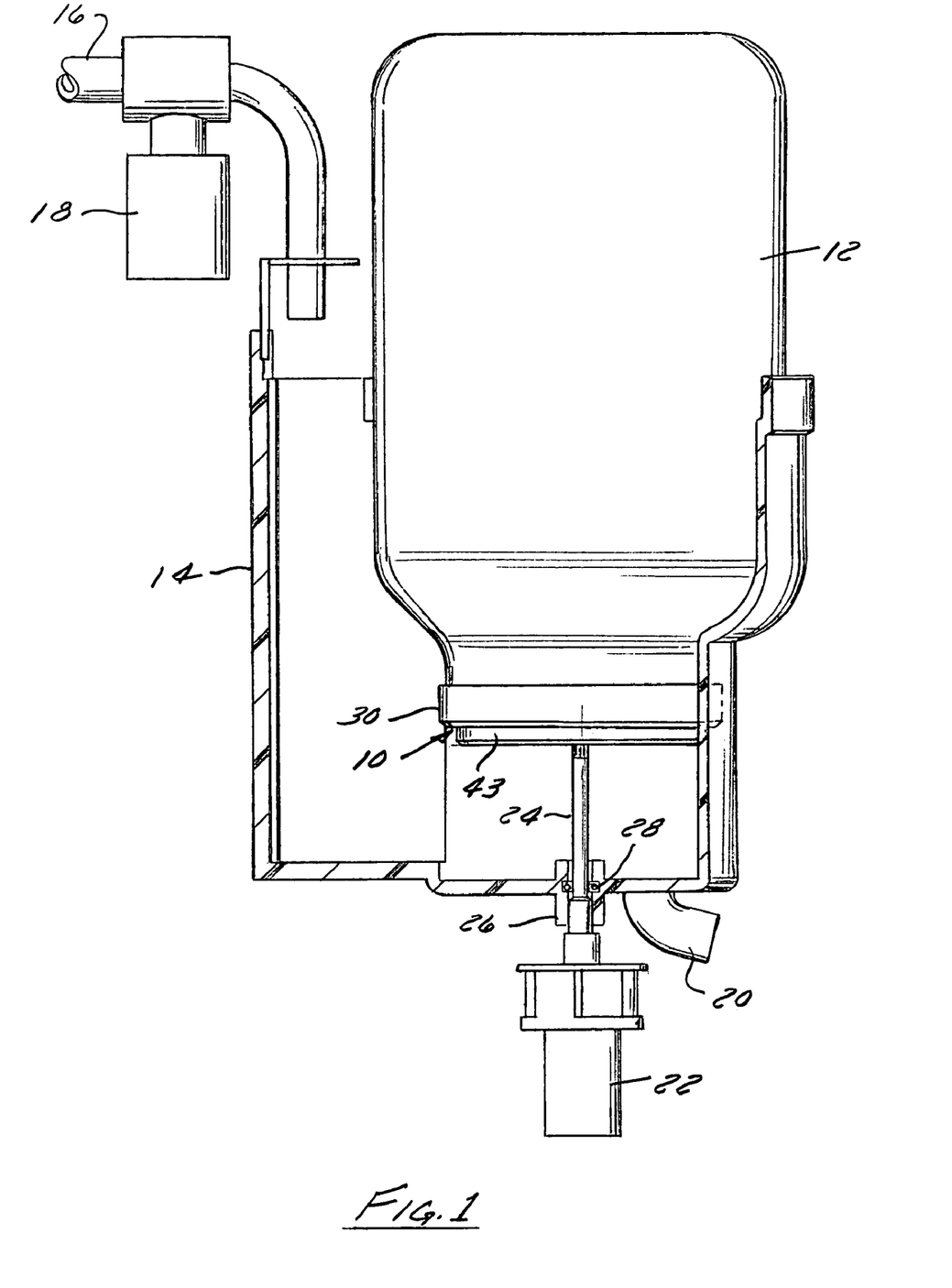
FIG. 1 is a side elevation view and in partial section showing the powder dispensing apparatus of this invention in conjunction with a receptacle.
Figure 3:
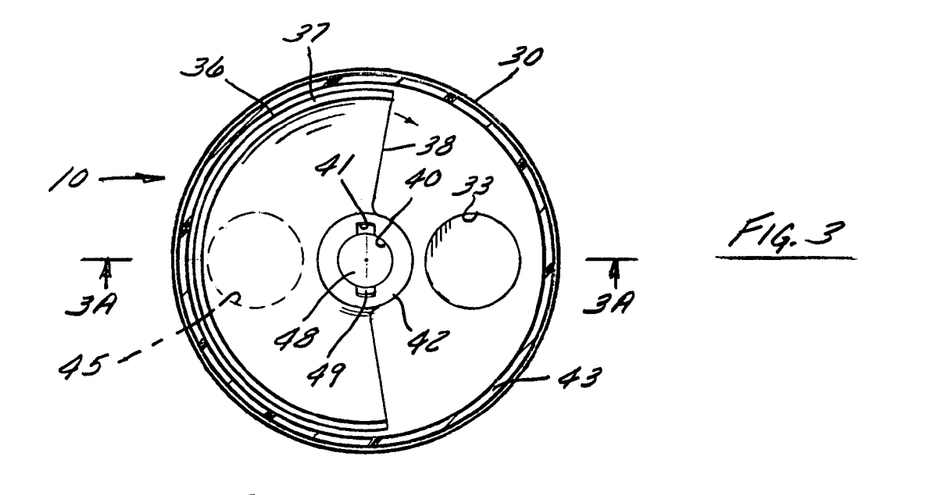
FIG. 3 is a top view of the dispensing apparatus in a first position.
Figure 3A:
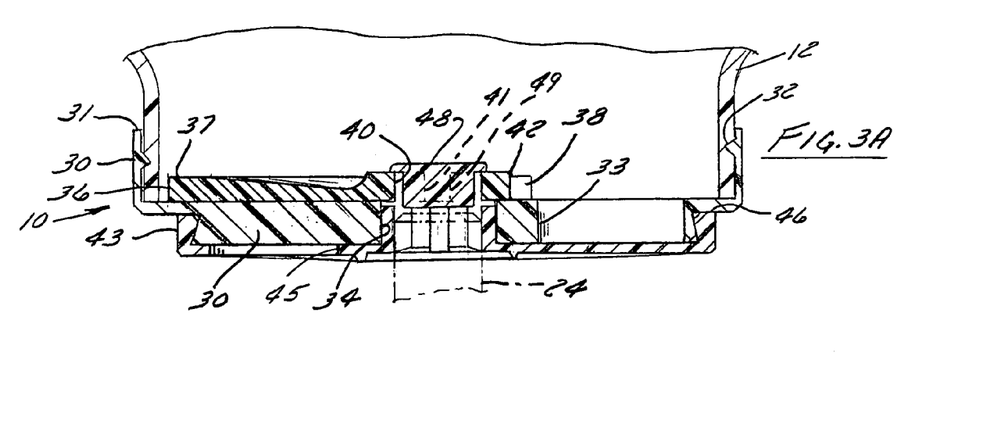
FIGS. 3A, 4A and 5A are views taken along lines 3A—3A, 4A—4A, and 5A—5A of FIGS. 3, 4 and 5, respectively.
Figure 4:
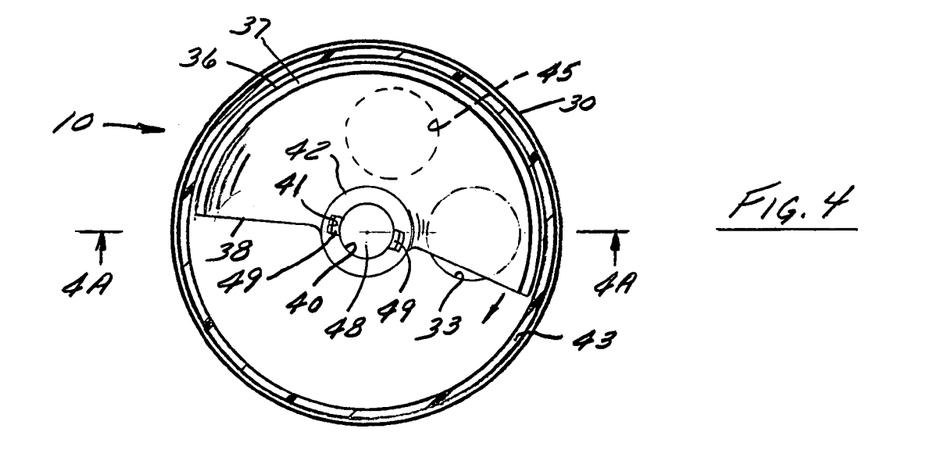
FIG. 4 is a view similar to FIG. 3 showing the dispensing apparatus in a second position.
Figure 4A:
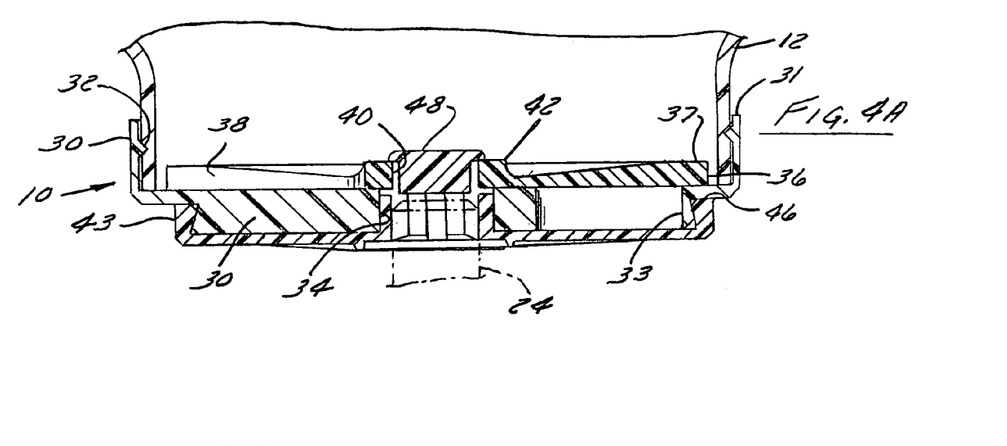
Figure 5:
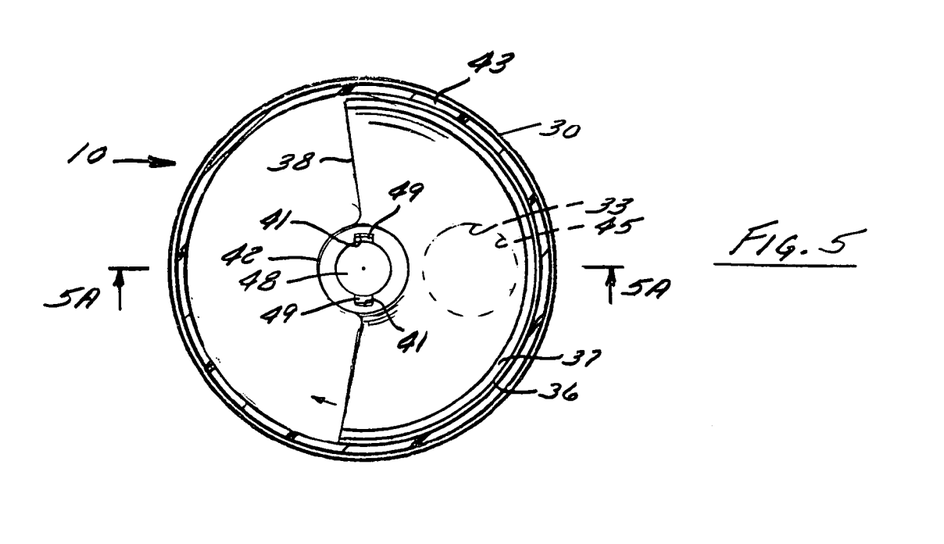
FIG. 5 is a view similar to FIG. 3 showing the dispensing apparatus in a third position.
Figure 5A:
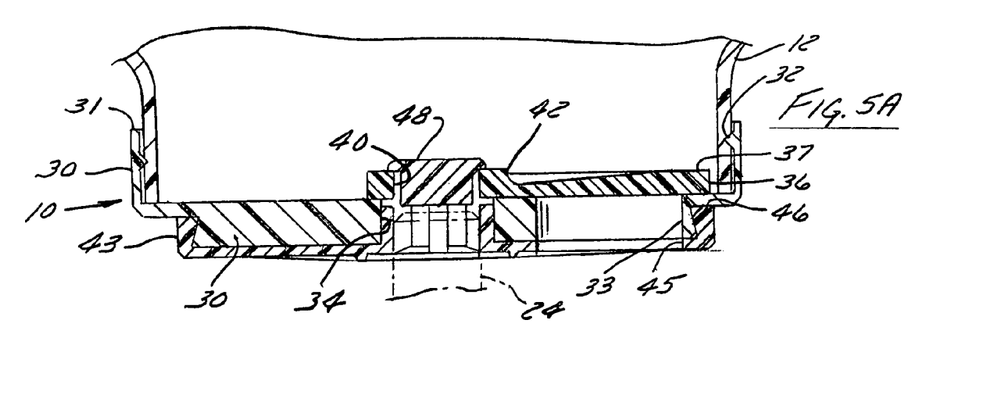

A better understanding of the metering and dispensing device will be had by a description of its operation. Referring to FIGS. 1 through 5A, and dispensing closure 10, a container 12 with a powdered material is supported in the receptacle 14. Water will be introduced into it through the water intake conduit 16. The metering and dispensing closure 10 is attached to the container 12 with the cap member 30, and rotatable disks 36 and 43 shown in the position in FIGS. 3 and 3A. In this position, powder material is free to enter into the measuring opening or chamber 33 in cap member 30 as it is uncovered by disk 36 and cutaway 38; however, it cannot pass into the receptacle 14 as its passage is blocked by rotatable disk 43, such as by wall 35. Activation of the drive member 22 and rotation of the drive shaft 24 causes the upper rotatable feeder disk 36 and the lower rotatable disk 43 to move to a position shown in FIGS. 4 and 4A. In this position, it is seen that no more powder material can enter the opening 33 which now becomes a measuring chamber. Continued rotation of the disks 36 and 43 positions them as shown in FIGS. 5 and 5A. Here it is seen that opening 33 is now positioned over opening 45 to allow the powdered material to flow into receptacle 14 and be mixed with the water. The mixed material then exits by means of the water outlet solutions conduit 20.

The operation of metering and dispensing closures 10A, 10B, 10C and 10D is substantially the same as described for metering and dispensing closure 10A. The differences are in the use of different drive mechanisms, such as shown by the motors 60A, 62B, 66C and 70D with the described associated drive mechanisms.

An important feature of the invention is in the stationary position of the cap member 30 in conjunction with the rotation of the rotatable disks 36 and 43. This feature provides the advantage of accurate depositing of powder material into the measuring opening 33. This is effected by the rotation of the disk 36 which causes a stirring of the powder inside the container 12 and consistent depositing of the powder material into the measuring opening 33. Another advantage in having the cap member 30 remain stationary with respect to disks 36 and 43 is that it can be manufactured more easily.

The dispensing closure of this invention has been described in conjunction with particular configurations of receptacles. It should be understood that any type of receptacle can operate in conjunction with this dispensing closure. They do not necessary have to have a receptacle that contains water. For example, they could be utilized in a receptacle and supported therein where the powder material would drop into another container having a liquid predisposed therein. Neither is it necessary that the dispensing closure be employed in conjunction with a receptacle employed with water. Other liquids such as water miscible and immiscible solvents including water and ether could be employed.

The preferred material for manufacturing cap member 30 and disks 36 and 43 is polypropylene. However, other chemical resistant resinous plastic materials can be employed such as polyethylene or Teflon®. If desired, a lubricant can be added to the plastic materials.

All such and other modifications within the spirit of the invention are meant to be within the scope as defined by the appended claims.

The invention claimed is:

1. A metering and dispensing closure for dispensing powder material from a container comprising:
   a container cap member attachable to the container, the container cap member having a first side adapted to be mounted facing an inside of the container and a second side adapted to be mounted facing an outside of the container, a measuring chamber positioned in the container cap member;
   a first rotatable disk member having at least one passage therein, the first rotatable disk member mounted on the first side of the container cap member;
   a second rotatable disk member having a passage therein, the second rotatable disk member mounted on the second side of the container cap member; and
   a housing with two of the metering and dispensing closures connected to the container and positioned in the housing;
   wherein when the disk members are rotated, powder material passes sequentially through the one passage in the first disk member, into the measuring chamber of the cap member, and then through the passage of the second disk.

2. The metering and dispensing closure as defined in claim 1 wherein the first and second rotatable disk members are interconnected to each other.

3. The metering and dispensing closure as defined in claim 2 wherein the second rotatable disk member includes a drive shaft engagement portion.

4. The metering and dispensing closure as defined in claim 1 wherein the first rotatable disk has a cutaway portion.

5. The metering and dispensing closure as defined in claim 1 wherein the cap member includes threads for attachment to complementary threads of the container.

6. The metering and dispensing closure as defined in claim 1 wherein the second rotatable disk member includes a gear for engagement by a complementary gear of a drive gear.

7. A powder dispensing apparatus comprising:
   a container cap member attachable to the container, the container cap member having a first side adapted to be mounted facing an inside of the container and a second side adapted to be mounted facing an outside of the container, a measuring chamber positioned in the container cap member;
   a first rotatable disk member having at least one passage therein, the first rotatable disk member mounted on the first side of the container cap member;
   a second rotatable disk member having a passage therein, the second rotatable disk member mounted on the second side of the container cap member, the first and second rotatable disk members connected to each other with the second rotatable disk member including a drive shaft engagement portion;
   a drive shaft connected to the drive shaft engagement portion;
   a drive member connected to the drive shaft; and
   a receptacle for housing the container cap member and the first and second rotatable disk members;
   wherein when the disk members are rotated, powder material passes sequentially through the one passage in the first disk member, into the measuring chamber of the cap member, and then through the passage of the second disk.

8. The powder dispensing apparatus as defined in claim 7 wherein the receptacle includes a liquid inlet and a liquid outlet.

9. The powder dispensing apparatus as defined in claim 7 wherein the drive member is disposed in the receptacle with the drive member operatively connected to the second rotatable disk member.

10. A powder dispensing apparatus comprising:
    a container cap member attachable to the container, the container cap member having a first side adapted to be mounted facing an inside of the container and a second side adapted to be mounted facing an outside of the container, a measuring chamber positioned in the container cap member;
    a first rotatable disk member having at least one passage therein, the first rotatable disk member mounted on the first side of the container cap member;
    a second rotatable disk member having a passage therein, the second rotatable disk member mounted on the second side of the container cap member, the first and second rotatable disk members connected to each other with the second rotatable disk member including a drive shaft engagement portion;
    a drive shaft connected to the drive shaft engagement portion;
    a drive member connected to the drive shaft; and
    a receptacle enclosing two of the container cap members and the first and second rotatable disk members and drive motors operatively connected to the first and second rotatable disk members;
    wherein when the disk members are rotated, powder material passes sequentially through the one passage in the first disk member, into the measuring chamber of the cap member, and then through the passage of the second disk.

* * * * *